United States Patent [19]

Taylor

[11] 4,324,954
[45] Apr. 13, 1982

[54] DIALING CIRCUITS AND METHODS FOR ELECTRONIC TELEPHONE SETS

[75] Inventor: Raymond G. Taylor, Shreveport, La.

[73] Assignee: Western Electric Company, Incorporated, New York, N.Y.

[21] Appl. No.: 154,677

[22] Filed: May 30, 1980

[51] Int. Cl.³ .............................................. H04M 1/274
[52] U.S. Cl. ............................. 179/90 B; 179/90 BD
[58] Field of Search ............. 179/90 B, 90 BD, 90 K, 179/2 DP

[56] References Cited

U.S. PATENT DOCUMENTS

| | | | |
|---|---|---|---|
| 3,804,984 | 4/1974 | Yachabach | 179/6.3 R |
| 3,920,926 | 11/1975 | Lenaerts et al. | 179/90 B |
| 3,932,709 | 1/1976 | Hoff et al. | 179/90 K |
| 4,008,379 | 2/1977 | Watkins | 179/90 K |
| 4,008,380 | 2/1977 | La Borde | 179/90 B |
| 4,011,414 | 3/1977 | Warren | 179/90 B |
| 4,032,722 | 6/1977 | Connolly et al. | 179/90 B |
| 4,119,810 | 10/1978 | Marin et al. | 179/90 K |
| 4,122,304 | 10/1978 | Mallien | 179/90 B |
| 4,243,845 | 1/1981 | Feinberg et al. | 179/90 B |

FOREIGN PATENT DOCUMENTS 2734139  2/1979 Fed. Rep. of Germany .... 179/90 B

OTHER PUBLICATIONS

"MAC-4: A Single-Chip Microcomputer", *The Bell System Technical Journal*, vol. 58, No. 4, Apr., 1979, pp.959-962, Chow & Troutman.
"MAC-4: A Single-Chip Microcomputer", *Proceedings of the IEEE*, Compucon, Fall 1979, Wash. D.C., Sep. 4-7, 1979, pp. 13-17, I.C. Eldumiati; et al.
"Index-A Versatile Automatic Dialler", *Telesis*, 6-1979, Reinhard Rosch.

*Primary Examiner*—Gerald L. Brigance
*Attorney, Agent, or Firm*—J. L. Landis; R. F. Kip, Jr.

[57] ABSTRACT

A dialing circuit (10) for an electronic telephone set including a microcomputer (40) having an RAM with two or more memory sections (I and II), each capable of storing data signals representing a telephone number. As the numbers are dialed by operation of a conventional pushbutton dial pad (70), the last number dialed (LND) is stored in RAM section I for automatic redial on operation of a redial key included in the dial pad ("LND," FIGS. 1-2; "LND-II" FIG. 3). A mechanism is provided for shifting a first LND from RAM section I to RAM section II, either selectively by operating a Save button (S) in FIGS. 1-2 or automatically on dialing a second number in FIG. 3. An additional key ("S/R," FIGS. 1-2 or "LND-I," FIG. 3) is provided for automatically redialing the first LND from RAM section II. The dialing circuits also include single button (F, P) dialing of a few emergency numbers ("Fire," "Police," "911," etc.). Preferably, the set is powered solely from the central office line current, and a mechanism is provided (C2) for maintaining the validity of the RAM data for an extended period of at least several hours after the set has been placed on hook.

7 Claims, 3 Drawing Figures

DIALING SIGNALS
TO CENTRAL OFFICE

DIALING CIRCUITS AND METHODS FOR ELECTRONIC TELEPHONE SETS

FIELD OF THE INVENTION

This application relates generally to dialing circuits and methods for electronic telephone sets, and particularly to microcomputer-controlled telephone sets having improved stored-number dialing and redialing facilities. Of special interest are circuits and methods for temporarily storing at least two previously dialed numbers, and selectively redialing a desired one of the stored numbers by operation of a corresponding redial key included in the dial pad.

BACKGROUND OF THE INVENTION

In connection with the development of proposed new electronic telephone sets, particularly sets of universal, as nearly world-wide applicability as is feasible, it is desirable to provide a versatile, low-power, microcomputer-controlled set having many special features not included in present standard telephones. Certain features and systems involved in the proposed new electronic telephone set are disclosed in my earlier filed, copending applications listed below (herein incorporated by reference):

Case 1: Ser. No. 67,080, filed Aug. 16, 1979, "Tone Ringing Circuits for Telephone Sets";

Case 2: Ser. No. 72,252, filed Sept. 4, 1979, "Circuits and Methods for Initializing the Loop Current of a Telephone Set";

Case 3: Ser. No. 86,024, filed Oct. 17, 1979, "Speech Networks for Telephone Sets."

In connection with the development of such telephone sets, it is desired to provide improved circuits for storing the last number dialed (LND) in temporary memory (RAM) and for redialing the stored number by operation of an LND redial key included in the dial pad, such LND redial circuits being generally well known in the art. It is further desirable to provide systems for separately storing both the last number dialed and one or more previously dialed numbers, and for selectively redialing any of the stored numbers, at the option of the user, by activation of a corresponding one of two or more redial keys. In connection with the development of a set powered solely from the central office line current, and having no local power source, it is particularly desirable to provide systems for storing previously dialed numbers for an extended time after hanging up the phone, preferably for a time of at least eight hours. It is also desirable to provide improved circuits for single-button dialing of a few permanently stored numbers, such as "Police," "Fire," etc., such systems being generally well known in the art.

SUMMARY OF THE INVENTION

In view of the foregoing discussion, an object of this invention is to provide improved dialing and redialing systems for electronic telephone sets, particularly for central-office powered, microcomputer-controlled telephone sets of the type described in my copending applications cited above.

A specific object is to provide systems for temporarily storing and single-button redialing any of at least two previously dialed numbers, thus providing a selective, multiple last-number dialed capability, particularly to provide such capability for an extended period after hanging up the telephone set.

Another specific object is to provide a line-powered set as discussed above, wherein previously dialed numbers can be stored for an extended period of at least several hours after the user hangs up the phone.

Other objects relate to the provision of improved microcomputer-controlled dialing systems including single-button dialing of a few prestored emergency numbers, such as "Police," "Fire," "911," etc.

With the foregoing and other objects in view, dialing circuits and methods in accordance with certain features of the invention include a random-access memory (RAM) having at least two memory sections (I and II), each capable of temporarily storing data representing a telephone number to be called. A dialing circuit is provided for generating data signals representing called numbers and for storing each number as dialed in section I of the RAM. A mechanism is provided for shifting a first LND from section I of the RAM to section II, so that a second number may be dialed and stored in RAM section I. First and second LND redial keys are provided, for selective operation to automatically redial either the number stored in RAM section I, or the number stored in RAM section II, at the option of the user.

Preferably, the telephone set, including the RAM, is powered solely from the central-office line current, and a mechanism is provided for maintaining the RAM powered for an extended period, after the set has been hung up, preferably at least several hours.

With these arrangements, it is possible to maintain a number that was busy or no answer, generally as in various prior-known LND systems. It is also possible to save the LND for an extended period, while placing other calls, and providing the capability of redialing the first LND at any time, and the ability to redial either of at least two previously dialed numbers by operation of a corresponding redial key. In a first embodiment, the shifting mechanism includes a "Save" key included in the dial pad, for selectively shifting a first LND to RAM section II only when the user desires to save the first LND, thus permitting the user to make any number of additional calls while preserving the first LND in RAM section II for redial at any time. In a second embodiment, the shifting mechanism operates automatically in response to dialing of each successive number to shift the previous LND to RAM section II each time a new number is dialed. In this embodiment, the user can selectively redial either the last number dialed or the second last number by operation of a corresponding redial key.

Other objects, advantages and features of the invention will be apparent from the following detailed description of specific examples and embodiments thereof, when read in conjunction with the accompanying drawings.

DETAILED DESCRIPTION

Figure 1:
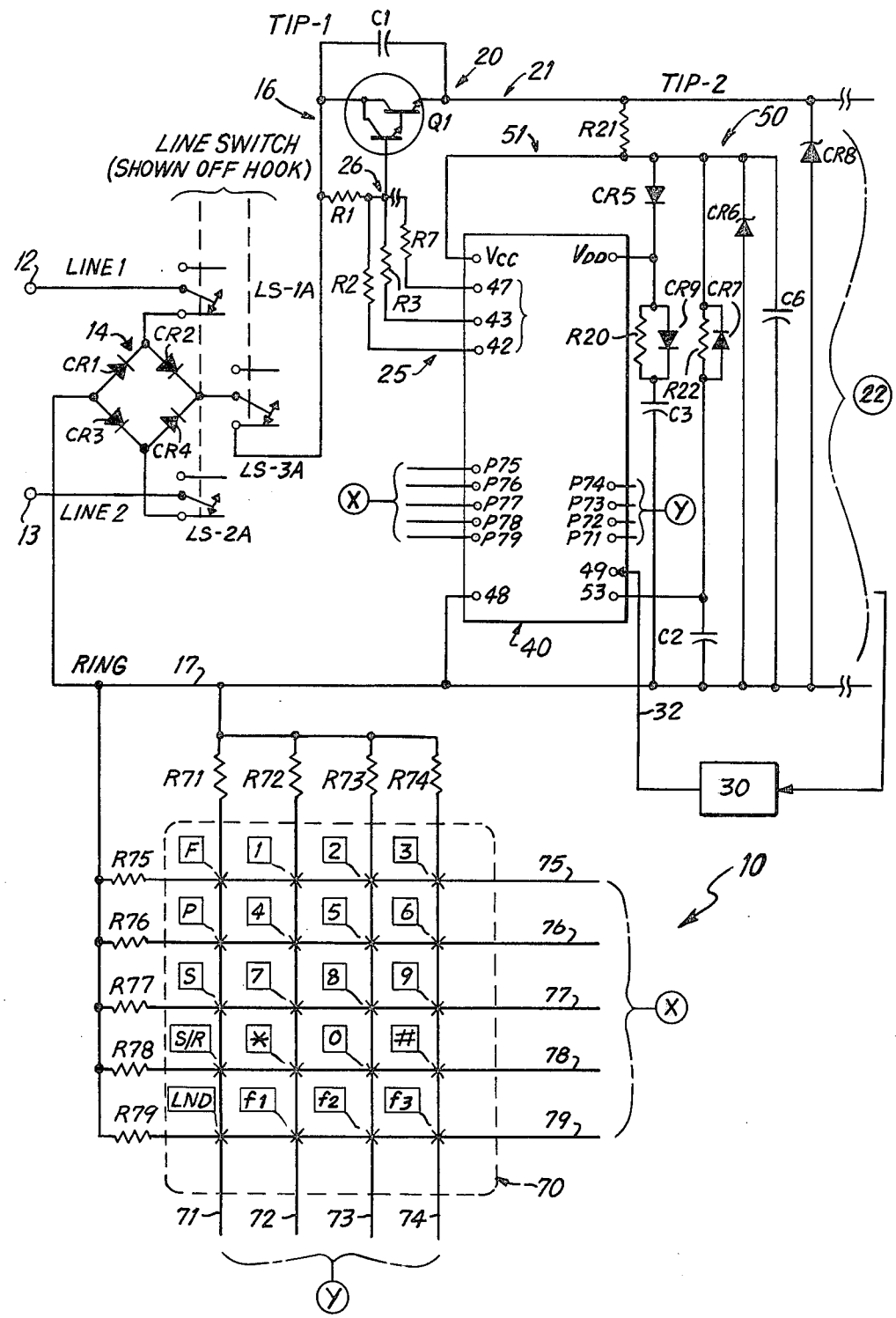
FIG. 1 is a circuit diagram of portions of an electronic telephone set, including dialing circuits in accordance with one specific embodiment of the invention.

Referring now in detail to the drawings and particularly to FIG. 1, there is illustrated portions of a line-powered, microcomputer-controlled electronic telephone set as disclosed in the three prior applications referred to above, and including dialing circuits 10 in accordance with a specific embodiment of this invention Background—General Arrangement of Telephone Set In the example illustrated, when the telephone handset is taken off hook, a first set of conventional line-switch contacts LS-1A, LS-2A, LS-3A close, at which time a dc input signal from the central office is applied to the set via input terminals 12 and 13 in conventional fashion. The input signal is routed through a polarity guard 14, consisting of a diode bridge CRI-CR4, to provide an operating voltage, essentially identical to the input, between a "tip-1" lead 16 and a "ring" lead 17, which may be regarded as circuit ground for the purposes of this application.

As described in detail in the above-cited copending application, Case 2, the tip-1 input is applied to a variable conductance device 20, such as a Darlington driver circuit Q1 connected as shown, via a base resistor R1 and a bypass capacitor C1, between the tip-1 input lead 16 and a "tip-2" output drive bus 21 for the telephone set speech network 22, and other components of the set, as described in detail in the copending applications Case 2 and 3 (relating to the speech network per se). As described in detail in Case 2, a control circuit 25 is provided to vary the conductance of the device 20 so as to adjust the supply voltage on the tip-2 bus to a preset, relatively low level, such as 6 volts±¼ volt, thus to preset the telephone set loop current to a desired value, such as 25 milliamps in a typical example, regardless of the input supply voltage and the loop length of the transmission line. In the example illustrated, this is done by selectively connecting combinations of parallel resistors R2 ... R7 between a base node 26 of the Darlington driver Q1 and the ring lead 17, so as to decrease the conductivity of Q1 in a programmed series of steps until the loop current has been set at the desired value.

For this purpose, a circuit 30 is provided for monitoring the loop current and providing an output 32 for operating a digital logic circuit or controller, such as a microcomputer chip 40, that controls many of the telephone set functions. In this case, the base resistors R1-R7 are connected to microcomputer input pins 42-47, and the microcomputer functions to selectively connect a preset sequence of the resistors R2-R7 to the ring lead 17 via a reference pin 48 of the chip, that is connected to the ring lead 17. The monitor output 32 is connected to a trigger input pin 49 of the microcomputer, to initiate the current-initialization operation each time the set is taken off hook.

As explained in further detail in the copending application, Case 2, when the telephone receiver first goes off hook, power is applied to the microcomputer 40 in generally conventional fashion by a network 50 including a resistor R21 connected between the tip-2 drive bus 21 and an intermediate microcomputer drive bus 51, which is connected to a first power input pin $V_{CC}$ of the microcomputer; a diode CR5 connecting the bus 51 to a second power input pin $V_{DD}$; a Zener diode CR6 and capacitor C6 connected in parallel between the bus 51 and the ring lead 17; a Zener diode CR8 connected between the tip-2 bus and the ring-lead 17; and a reset circuit including R22, CR7 and C2 connected as shown between the bus 51 and the ring lead 17, and to a reset pin 53 of the microcomputer. In addition, the power input pin $V_{DD}$ is connected to the ring lead 17 by a power-maintenance circuit including R20, CR9 and C3 arranged as shown, as will be described in further detail hereafter.

Dialing Circuits

After the telephone set has thus been turned on and preset by the current-initialization circuit 25 for operation at the desired tip-2 voltage level, the dialing circuits 10 are prepared to initiate a dialing sequence in response to the operation of a dialing mechanism, such as a generally conventional pushbutton dial pad 70. As in standard dial pads, the pad 70 includes an array of pushbuttons or keys designated "1"—"0", * and #, which on operation close corresponding dialing network switch crosspoints indicated by "X's" in FIG. 1.

The dialing network includes a plurality of parallel Y-buses, 71, 72, 73, 74, that are connected to corresponding microcomputer input ports P71 to P74, as indicated by broken connection (Y), and also to ring lead 17 through associated pull-down resistors R71 to R74. The pad network 70 further includes a set of parallel X buses, 75, 76, 77, 78, 79, that are connected between microcomputer ports P75 to P79, as indicated by broken connection (X), and the ring lead 17 through associated pull-down resistors R75 to R79.

In operation, after initializing the telephone set current, the microcomputer 40 scans all inputs from the dial pad 70, per a programmed I/O "SCAN/SWITCH" mode of operation, looking for a contact closure. In this embodiment, when a contact closure is detected, the microcomputer decodes the button function by virture of the X and Y coordinates and responds accordingly. If dialing buttons 0 thru 9 are depressed, the microcomputer generates dial pulses by turning Q1 on and off a programmed number of times corresponding to the particular contact that was closed. For example, if the number "7" contact is closed, the microcomputer turns Q1 on and off seven times at a desired duty factor and pulse rate, to provide a conventional "7" output dial pulse signal to the central office, by alternately turning off and on the telephone set current. In the specific example illustrated, the SCAN/SWITCH section of the microcomputer is programmed to intermittently close all of the connections to ground the base node 26 of Q1, thus turning Q1 off and on the preset number of times. Thus, the dialing circuit 10 and microcomputer 40 function to generate a dc pulse dialing output, as is standard in many telephone systems, in response to operation of a conventional pushbutton dial pad 70. The microcomputer 40 may be connected with straps (switches), as needed, to provide a desired pulse rate, typically either 5 to 10 pulses per second, and "duty factor" (% break/% make), typically from 50/50 to 70/30.

Of course, where dual-tone, multifrequency dialing is desirable, as in the standard Bell System Touch-Tone ® service, instead of dc-pulse dialing, this can be accomplished either by a plug-in module and switch to disable the dc pulse circuits, or by a built-in tone-generating system as in standard multifrequency sets, which is operated by the microcomputer 40. Thus, either or both dialing modes may readily be provided, in accordance with the needs of the user.

In connection with the dialing circuits, the general principles of dialing circuits controlled by a microcomputer or similar electronic controller are known in the art, typical examples providing further background and examples of circuits being described in the following U.S. Pat. Nos. (herein incorporated by reference): A. Marin et al. 4,119,810; A. G. Watkins 4,008,379; S. J. Hoehn et al. 3,982,079; and L. E. Jakobsson 3,980,837.

The dial pad 70 may correspond in part to the standard U.S. twelve-button pad, containing the numerals 0-9 and the characters * and #. In the embodiment illustrated, an expanded twenty-button keyboard is provided, containing an extra Y bus (71) and an extra X bus (79), so as to provide feature buttons or keys to perform additional functions desired by the user and implemented by programming of the microcomputer 40. In particular, as concerns this application, several of the additional keys are utilized to provided last-number redialing and stored number dialing features, as described in the following sections of the application.

Last-Number Dialed Operation

One additional feature of interest is "last-number dialed" (LND) redialing, in which each number dialed is temporarily stored in a random-access memory (RAM) section of the microcomputer 40. This number is retained in the RAM until another number is dialed or, eventually, the RAM loses power as discussed hereafter. If the number dialed is busy, no answer, or otherwise it is desired to redial the same number within the RAM-retention period, in the example illustrated, the handset is again removed from the cradle to reactivate the network and the microcomputer 40 as described above, and a single last-number dialed button or key, designated "LND" on the dial pad 70, is then depressed. This operates the microcomputer 40 to automatically redial the last number from the RAM, as is generally well known in principle. In this example, the LND key is located at the crosspoint of the additional Y bus 71 and the additional X bus 79, in which example the microcomputer senses an input signal at ports 71 and 79, which is decoded so as to dial the number stored in the RAM, as is generally well known in the art, to redial the stored number in the same manner previously described.

In connection with LND operation, the general principles of LND redialing controlled by a microcomputer or similar electronic controller unit are well known in the art, typical examples providing further background and examples of circuit details being illustrated in the following U.S. Pat. Nos. (herein incorporated by reference): A. Marin et al. 4,119,810; G. V. Lenaerts et al. 3,920,926; and D. G. Hoff et al. 3,932,709.

After dialing a number and storing data signals representing the number in the RAM, when the handset is placed back on hook in the example illustrated, the tip-2 bus is de-energized as the switchhook contacts LS-1A to LS-3A reopen and the driver Q1 is turned off. In the preferred embodiment illustrated, in which the set is powered solely from the central-office line current at input terminals 12 and 13, this turns off the main drive power ($V_{CC}$, $V_{DD}$) to the microcomputer 40. However, the microcomputer RAM sections require very little power to retain the data stored in the RAM, the time period after loss of power during which valid data can be retained being referred to as the "RAM-retention period." In one example, discussed in further detail hereafter, of a CMOS single chip microcomputer, the RAM sections can be maintained at a power input of less than three microwatts. Preferably, to augment the RAM-retention period in the embodiment illustrated, the capacitor C3 maintains power to the RAM for an extended period of at least several hours, such as eight hours in a typical example. The capacitor C3 is connected as shown between the tip-2 bus 21, the ring lead 17 and the input port $V_{DD}$ via R21, CR5, and the parallel combination of R20 and CR9. This provides an extended RAM-retention period or "sleep state," during which the data stored in RAM can be retrieved if power to the microcomputer is turned back on prior to the end of the retention period. After the retention period, the charge on C3 dissipates below a usable level.

As a safeguard to prevent dialing of an invalid number if the operating voltage to the RAM has dropped below a safe level, the software of the microcomputer contains a program to write reference data into RAM each time a last number dialed is entered into memory. Subsequently, any time the LND button is depressed, the reference data in RAM is compared to like data in ROM; if the two compare, the volatile memory has not crashed as a result of the telephone set on-hook state exceeding the 8-hour RAM retention period, and thus the LND operation is enabled. Conversely, if the set has been on-hook longer than 8-hours, such that the charge on capacitor C3 has discharged too low to maintain volatile memory (i.e., RAM), then the reference data in ROM will result in an inequality and thus inhibit the LND operation, to safeguard against dialing an erroneous telephone number. (See FIG. 2)

Save and Save Redial Functions

Figure 2:
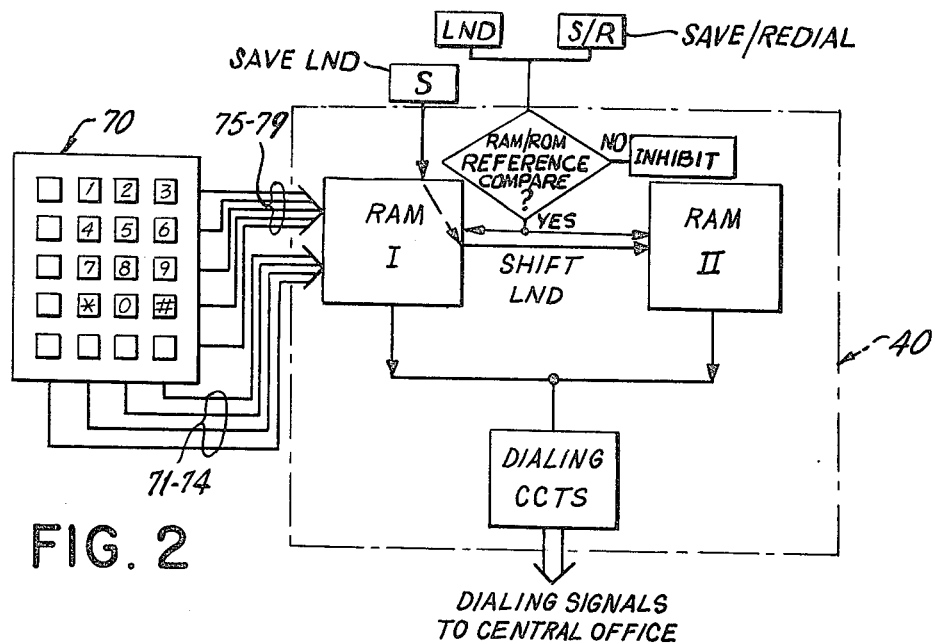
FIG. 2 is a schematic diagram of a multiple last-number dialed system in accordance with a first specific embodiment of the invention.

In accordance with a first specific embodiment of the invention illustrated in FIGS. 1 and 2, the keyboard 70 also contains a "Save" button designated "S," which can selectively be operated by the user to shift the last-number-dialed data from a first section of the RAM, designated RAM section I, to a second section designated RAM section II, by transfer techniques well known in the art. The Save key is operated whenever the user wishes to move a first LND within RAM, to prevent a subsequent dialing from "writing over" the previous LND, as the user makes additional calls. The saved number is protected during the entire off-hook time of such additional calls, plus the RAM-retention period after the last such additional call. The saved number can be redialed automatically, whenever desired, by operating a "Save/Redial" key, designated "S/R," included in a keyboard. The S/R key functions similarly to the LND redial system described above, to redial the saved number stored in RAM section II. When an additional call is made after an operation of the Save button, the second or the latest LND is temporarily stored in RAM section I, so that the user has a choice of redialing either the first LND from RAM section II by operation of the S/R key, or of redialing the second (or latest) LND by operation of the LND key. In this embodiment, dialing of a new number automatically erases the previous number stored in section I, and it is necessary to operate the Save key in order to retain a particular LND while other calls are placed. Thus, there has been provided a simple and efficient, selective multiple LND capability, with very little additional circuitry or equipment required and easily implemented in present-day CMOS microcomputer chips.

Multiple Last-Number-Dialed Function—Second Embodiment

Figure 3:
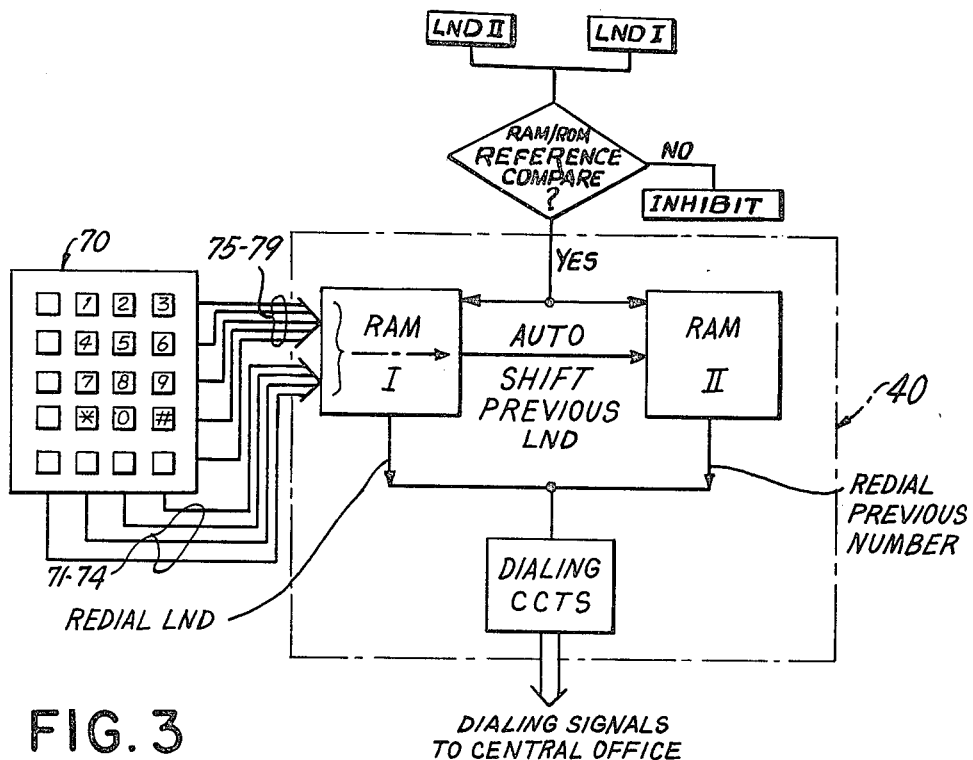
FIG. 3 is a schematic diagram of a multiple LND system in accordance with a second embodiment of the invention.

In accordance with a second embodiment of the invention, illustrated in FIG. 3, the LND is automatically shifted from RAM section I to RAM section II when a second number is dialed, and the second number is stored in RAM section I as in the first embodiment. In this embodiment, there is no "Save" key and the first number dialed can be redialed by operation of an "LND-I" key and the second number can be redialed by operation of an "LND-II" key. Of course, a third or additional RAM sections and redial buttons can be provided where it is desired to have the capability of automatically redialing three or more previously dialed numbers, but a two-stage LND capability will satisfy the needs of most customers.

The second embodiment of the system is simpler than the Save+Save/Redial system of the first embodiment, but has the disadvantage that the user cannot selectively save a first number while placing more than one additional call, or more calls than the number of RAM sections provided, where additional stages are included.

Emergency Number Dialing

In addition, wherever desired, emergency or other widely called numbers, such as "Police," "Fire," or the U.S. standard "911" emergency number, can be permanently stored in ROM (read-only memory) sections of th microcomputer, and automatically dialed by operation of a corresponding single dedicated button of the keyboard, such as "P" (Police) and "F" (Fire) in the example keyboard layout 70 illustrated in FIG. 1. In general, use of a single dedicated button to dial emergency numbers is well known in the art; for example, as described in J. J. Yachabach U.S. Pat. No. 3,804,984 or D. C. A. Connolly et al. U.S. Pat. No. 4,032,722, both herein incorporated by reference. Additional buttons, such as are designated $f_1$, $f_2$, $f_3$ in the example 4×5 twenty-button keyboard 70 illustrated in FIG. 1, may be used for additional stored number dialing capability or to implement various other microcomputer-controlled functions desired for the telephone set or system involved.

Controller or Microcomputer 40

Obviously, the specific details of the controller or "microcomputer," in modern parlance, are not important to the practice of the invention, and this can be any known digital logic circuit or microprocessor capable of implementing the relatively simple switching, scanning, and data-storage functions involved in dialing and storing telephone numbers as described in this application, and in controlling the operation of an electronic telephone set as described in the prior copending applications cited above. Various examples of data-processing circuits and components of this general type are described in the various prior-art patents cited above.

In a specific example, the microcomputer 40 is a CMOS microcomputer chip manufactured by Western Electric and referred to as the "MAC-4" microcomputer, as generally described in the following articles:

(1) "MAC-4: A Single-Chip Microcomputer," by W. F. Chou and W. W. Troutman, *The Bell System Technical Journal*, Vol. 58, No. 4, PP. 959–962 (April, 1979); and (2) "MAC-4: A Single Chip Microcomputer," I. I. Eldumiati et al., *Proceedings of the IEEE*, "Compucon, Fall '79," Washington, D.C., Sept. 4–7, 1979, pages 13–17.

The MAC-4 is a versatile, low-power microcomputer chip that can be used as a controller for various functions in a telephone set, including the dialing and redialing functions of this application and can be driven solely from the central office input signals, without the use of auxiliary power sources. Some further details of the MAC-4 microcomputer and operation may be obtained from the following copending patent applications, herein incorporated by reference:

(1) V. K-L. Huang—R. L. Ruth, Ser. No. 974,426, filed Dec. 29, 1978, entitled "Data Processing Apparatus Having Opcode Extending Register";

(2) D. E. Blahut—D. H. Copp—D. C. Stanzione, Ser. No. 974,425, filed Dec. 29, 1978, entitled "Data Processing Apparatus Providing Variable Operand Width Operation";

(3) D. E. Blahut—D. H. Coop—D. C. Stanzione, Ser. No. 974,363, filed Dec. 29, 1978, entitled "Data Processing Apparatus Providing Autoloading of Memory Pointer Registers";

(4) D. E. Blahut—D. H. Coop—D. C. Stanzione, Ser. No. 974,361, filed Dec. 29, 1978, entitled "Data Processing Apparatus Providing Autoincrementing of Memory Point Register";

(5) D. E. Blahut—R. L. Ukeiley, Ser. No. 71,712, filed Aug. 31, 1979, entitled "Microprocessor Using a Double Op Code Instruction";

(6) D. E. Blahut—V. K-L. Huang,—R. L. Townsend, Jr., Ser. No. 71,750, filed Aug. 31, 1979, entitled "Microcomputer Arranged for Direct Memory Access"; and (7) V. K-L. Huang, Ser. No. 71,719, filed Aug. 31, 1979, entitled "Special Address Generation Arrangement."

With the above arrangements and those described in the copending applications, a very simple, low-powered electronic telephone set has been provided, which can be powered solely from the central office line current, and which is very versatile as to the functions that can be performed, particularly as to the dialing, LND redialing and stored number dialing functions forming the subject matter of this application. While various specific examples and embodiments of the invention have been described in detail herein, it should be apparent that various modifications may be made from the specific details described, without departing from the spirit and scope of the invention.

What is claimed is:

1. A dialing circuit for an electronic telephone set which comprises:

a RAM having two memory sections (I and II), each capable of storing data signals representing a telephone number;

dialing means for generating data signals representing called numbers and for storing each number as it is dialed in section I of the RAM;

means for shifting a first LND from section I of the RAM to section II, so that the dialing means stores a second LND in RAM section I; the shifting means being automatically operable in response to dialing of each successive number to shift the previous LND to RAM section II each time a new number is dialed, so that the user at his or her option can redial either the last number dialed or the second last number by operation of a corresponding redial key associated with the dialing means and being one of the keys hereinafter recited in this claim;

a first LND redial key;

means responsive to operation of the first redial key for automatically redialing the first LND stored in RAM section II;

a second LND redial key; and means responsive to operation of the second redial key for automatically redialing the second LND stored in RAM section I.

2. A dialing circuit as recited in claim 1 wherein the telephone set includes a microcomputer of which the RAM forms a part thereof, and the telephone set including the microcomputer is powered solely from the central office line current; and means are provided for maintaining the RAM powered, with another part of the microcomputer being unpowered, for a period of at least several hours after the set has been placed on hook, so as to retain the LND information in the memory sections for an extended period.

3. A dialing circuit as recited in claim 2, wherein the maintaining means includes at least one power-storing capacitor connected between the tip lead and the ring lead and connected to a power input terminal for the RAM to supply power thereto from said capacitor during such period.

4. An electronic telephone set including:

a microcomputer connected between the telephone set tip and ring leads and powered solely from the telephone set line current whenever the set is taken off hook;

a dial pad having an array of pushbuttons designating numbers to be dialed and a plurality of function buttons, the dial pad having an array of contacts associated with the buttons and connected to a corresponding array of microcomputer input pins, the microcomputer including means for generating dialing signals in response to inputs from the dial pad;

a RAM forming part of the microcomputer and having first and second memory sections (I and II), each capable of storing data signals representing a dialed number;

means for storing each number as dialed in RAM section I;

a last-number dialed (LND) function button included in the dial pad and having a contact connected to a microcomputer input pin;

means responsive to operation of the LND button for automatically redialing the number stored in RAM section I;

a "Save" function button included in the dial pad and having a contact connected to a microcomputer input pin;

means responsive to operation of the Save button for shifting a first LND from RAM section I to RAM section II so that, subsequently, additional numbers can be dialed and stored in RAM section I;

a "Save/Redial" function button included in the dial pad and having a contact connected to a microcomputer input pin; and means responsive to the operation of the Save/Redial button for automatically redialing the number stored in RAM section II.

5. A telephone set as recited in claim 4, further comprising a capacitor circuit connected between tip and ring and to a power input pin of the microcomputer so as to maintain the RAM powered by capacitor-stored power, with another part of the microcomputer being unpowered, for an extended period after the telephone set is placed on hook, the microcomputer including means for testing the validity of the RAM data before LND operation to prevent dialing of an erroneous number after the operating voltage of the RAM has dropped below a safe level.

6. A method of operating an electronic telephone set for temporarily storing and selectively redialing either of at least two previously dialed telephone numbers, which comprises:

(a) temporarily storing data signals representing the last-number dialed (LND) in a first memory section (I) of a RAM having two memory sections (I and II) each capable of storing data signals representing a telephone number;

(b) shifting a first LND from RAM section I to RAM section II, so that a second number may be stored in RAM section I; the shifting function being performed automatically in response to dialing of each successive number to shift the previous LND to RAM section II each time a new number is dialed, so that the user at his or her option can redial either the last number dialed or the second last number by operation of a corresponding redial button included in a pushbutton dial pad for the telephone set, and being one of the keys hereinafter recited in this claim 3 and then, at such option of the user, either (c) redialing the first LND by operation of a first redial key; or (d) redialing the second LND by operation of a second redial key.

7. An electronic telephone set including:

a microcomputer connected between the telephone set tip and ring leads;

a dial pad having an array of pushbuttons designating numbers to be dialed and a plurality of function buttons, the dial pad having an array of contacts associated with the buttons and connected to a corresponding array of microcomputer input pins, the microcomputer including means for generating dialing signals in response to inputs from the dial pad;

a RAM forming part of the microcomputer and having first and second memory sections (I and II), each capable of storing data signals representing a dialed number;

means for storing each number as dialed in RAM section I;

a last-number dialed (LND) function button included in the dial pad and having a contact connected to a microcomputer input pin;

means responsive to operation of the LND button for automatically redialing the number stored in RAM section I;

a "Save" function button included in the dial pad and having a contact connected to a microcomputer input pin;

means responsive to operation of the Save button for shifting a first LND from RAM section I to RAM section II so that, subsequently, additional numbers can be dialed and stored in RAM section I;

a "Save/Redial" function button included in the dial pad and having a contact connected to a microcomputer input pin; and means responsive to the operation of the Save/Redial button for automatically redialing the number stored in RAM section II.

* * * * *